United States Patent [19]
Hunter et al.

[11] Patent Number: 5,996,608
[45] Date of Patent: Dec. 7, 1999

[54] DIAPHRAGM VALVE WITH FILTER SCREEN AND MOVABLE WIPER ELEMENT

[75] Inventors: Richard E. Hunter, La Jolla; Revis R. Hunter, Escondido, both of Calif.

[73] Assignee: Hunter Industries, Inc., San Marcos, Calif.

[21] Appl. No.: 09/127,017

[22] Filed: Jul. 31, 1998

[51] Int. Cl.[6] ............................. B08B 1/00; F16K 31/02; F16K 31/42; F16L 55/24

[52] U.S. Cl. .................. 137/244; 137/547; 137/549; 210/353; 210/355; 210/390; 210/396; 210/413; 210/429; 210/432; 251/30.02; 251/46

[58] Field of Search .................. 137/549, 550, 137/242, 244, 547; 210/391, 395, 396, 413, 429, 432, 354, 355, 390, 407, 415, 431; 251/30.01, 30.02, 30.05, 45, 46

[56] References Cited

U.S. PATENT DOCUMENTS

| | | | |
|---|---|---|---|
| 4,081,171 | 3/1978 | Morgan | 251/30.02 |
| 4,360,037 | 11/1982 | Kendall | 137/242 |
| 5,213,303 | 5/1993 | Walker | 251/30.02 |

*Primary Examiner*—George L. Walton
*Attorney, Agent, or Firm*—Michael H. Jester

[57] ABSTRACT

A diaphragm-type control valve for irrigation systems has an outer clam-shell housing that encloses a vertically reciprocable diaphragm assembly. A primary valve seat inside the housing is engaged and disengaged by a seal on the underside of the diaphragm to open and close the valve by connecting and disconnecting its inlet and outlet passages. Pressurized water from a lower inlet chamber of the valve travels through a small metering orifice in the center of the diaphragm assembly to an upper pressure control chamber above a flexible membrane of the diaphragm assembly. A solenoid actuated pilot valve is operatively coupled to the upper pressure control chamber for venting pressurized water therefrom to permit the diaphragm assembly to move upwardly to open the valve. A filter screen is mounted to the underside of the diaphragm assembly to prevent debris from clogging the metering orifice, clogging the small passages of the pilot valve, or fouling the solenoid. A cylindrical wiper element supported by a cylindrical carrier surrounds the filter screen and is moved up and down along the filter screen as the valve opens and closes to scour algae, mineral deposits and other debris from the surface of the filter screen which are carried away through the main outlet passage of the valve.

30 Claims, 5 Drawing Sheets

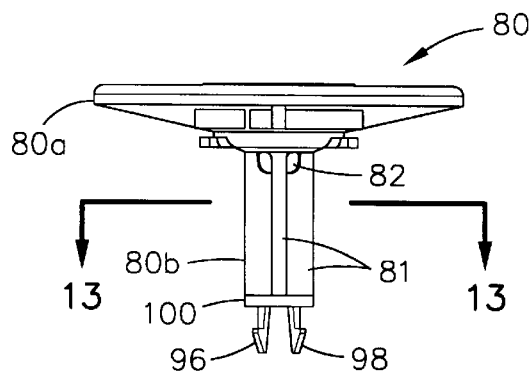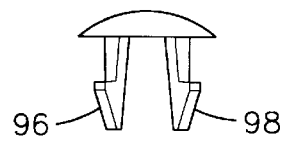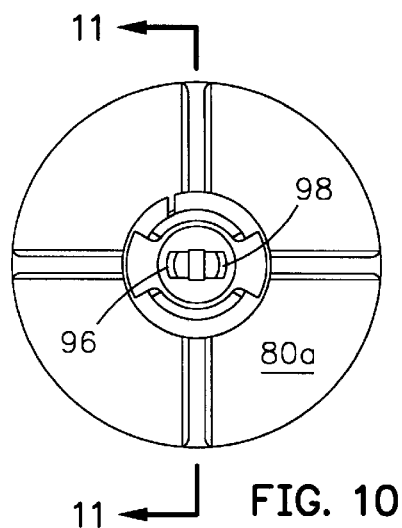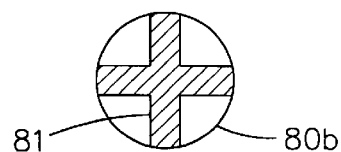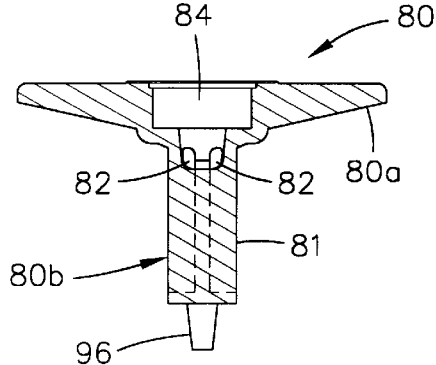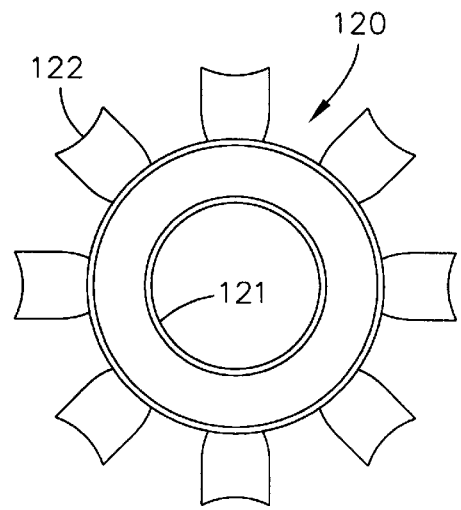

DIAPHRAGM VALVE WITH FILTER SCREEN AND MOVABLE WIPER ELEMENT

BACKGROUND OF THE INVENTION

The present invention relates to irrigation systems, and more particularly, to an improved filter screen assembly for diaphragm-type irrigation control valves.

The use of valve controlled pressurized irrigation systems for supplying water for the irrigation of plants is extensive throughout the world today. One of the most prevalent systems, particularly for lawn areas and athletic fields, includes a plurality of sprinklers positioned for distributing water over the surface of a land area. One or more control valves connect and disconnect water from a pressurized main supply line to branch lines each typically having several sprinklers connected thereto.

Commercial, municipal and golf course irrigation systems increasingly rely on alternative water sources including reclaimed water. This trend has been prompted by a need to conserve water in many parts of the country. Other water sources used for irrigation include lakes, reservoirs, wells, and the like. However, since water from these sources often contains dirt, sand and other particles and debris, its use has brought with it an increase in the incidence of clogging of various components of irrigation systems. While the most readily apparent solution is to filter the water before it enters the irrigation system, the cost of stand-alone filters, and their maintenance, limits the degree of filtering that is economically feasible.

The problem of clogging in irrigation systems is most acute in portions of the system where water must pass into and around small spaces and through small openings. Small openings occur, for example, in irrigation systems having pilot operated and pressure responsive control valves, pressure regulating valves, in drip systems, and in other low flow irrigation configurations. Another area where dirt and debris cause problems is where the water comes into contact with moving parts. One example where such problems occur is in small solenoid operated plunger valves which have a small valve seal on the end of a plunger which extends into a water passage and acts as a pilot valve.

Pressure responsive and pressure regulating valves used in irrigation systems typically have a main diaphragm valve that is normally pilot operated. Upstream or inlet water pressure passes via a small metering orifice to the back side of the main diaphragm assembly to apply valve closing pressure. The water is vented from the back side of the diaphragm valve via a small pilot valve passage controlled by a solenoid operated pilot valve to the main outlet passage of the valve. Hydraulically actuated diaphragm valves also vent water pressure from the downstream side of the diaphragm, without the need for a solenoid. The small metering orifice through the main diaphragm assembly can become clogged, thereby causing valve failure. The small pilot valve passage can also become clogged with dirt and other debris and impair proper operation of a diaphragm valve.

The pilot valve of an electrically controlled diaphragm valve is normally operated by a plunger of a solenoid that moves back and forth in a bore in a housing surrounded by a coil with the valve seal being an elastomeric disc on the end of the plunger which selectively engages a valve seat. The water controlled by the pilot valve typically flows around and frequently along between the pilot valve plunger and its housing either during pressurization or venting of the control valve. Dirt and debris in the water frequently jam between the plunger and its housing preventing its normal operation. Sealing around or between the plunger and its housing is difficult because the plunger must be free to move and air or other fluids must be free to move in and out of the bore along the plunger.

Accordingly, there is a need for an irrigation control valve with a built-in filter to protect its metering orifice, pilot valve, solenoid, venting passages and other delicate components from clogging and contamination.

SUMMARY OF THE INVENTION

Accordingly, it is the primary object of the present invention to provide an improved diaphragm valve having a built-in filter assembly from removing dirt and debris from the inlet side of the valve that might otherwise impair its proper operation.

In accordance with the present invention a diaphragm valve includes an outer valve housing having an inlet passage, an outlet passage, a primary valve seat between the inlet passage and the outlet passage, a lower inlet chamber below the primary valve seat, and an upper control chamber above the primary valve seat. The diaphragm valve further includes a pilot valve operatively associated with the upper control chamber for selectively venting pressurized water therefrom. A diaphragm assembly is mounted inside the valve housing and has a seal normally engaged with the primary valve seat to seal the inlet passage from the outlet passage. The diaphragm assembly is moveable in a first direction to disengage the seal from the primary valve seat upon release of a sufficient amount of pressurized water from the upper control chamber. The diaphragm assembly also has an orifice for metering water from the lower inlet chamber through the diaphragm assembly into the upper control chamber. A longitudinally extending filter assembly is located inside the lower inlet chamber and is coupled to the water metering orifice for removing debris from pressurized water before it passes from the inlet passage into the upper control chamber through the diaphragm assembly. The filter assembly includes a filter screen and a wiper element surrounding the filter screen and mounted for longitudinal reciprocation over an exterior surface of the filter screen to remove debris. The wiper element is moved in the first direction by water flowing from the inlet passage to the outlet passage.

BRIEF DESCRIPTION OF THE DRAWINGS

The above and other objects and advantages of the present invention will become apparent from the following description when read in conjunction with the drawings wherein:

FIG. 9 is an enlarged side elevation view of the central support member of the diaphragm assembly of FIGS. 2–4;

FIG. 10 is a bottom plan view of the central support member of FIG. 9;

FIG. 11 is a vertical sectional view of the central support member taken along line 11—11 of FIG. 10;

FIG. 12 is an enlarged fragmentary view of the lower end of the central support member illustrated in FIG. 9;

FIG. 13 is a horizontal cross-sectional view of the stem portion of the central support member taken along line 13—13 of FIG. 9; and FIG. 14 is an enlarged plan view of an alternate embodiment of the wiper element carrier that is provided with blades to impart rotational movement of the same as water flows past the carrier.

DETAILED DESCRIPTION OF THE PREFERRED EMBODIMENTS

Figure 1:
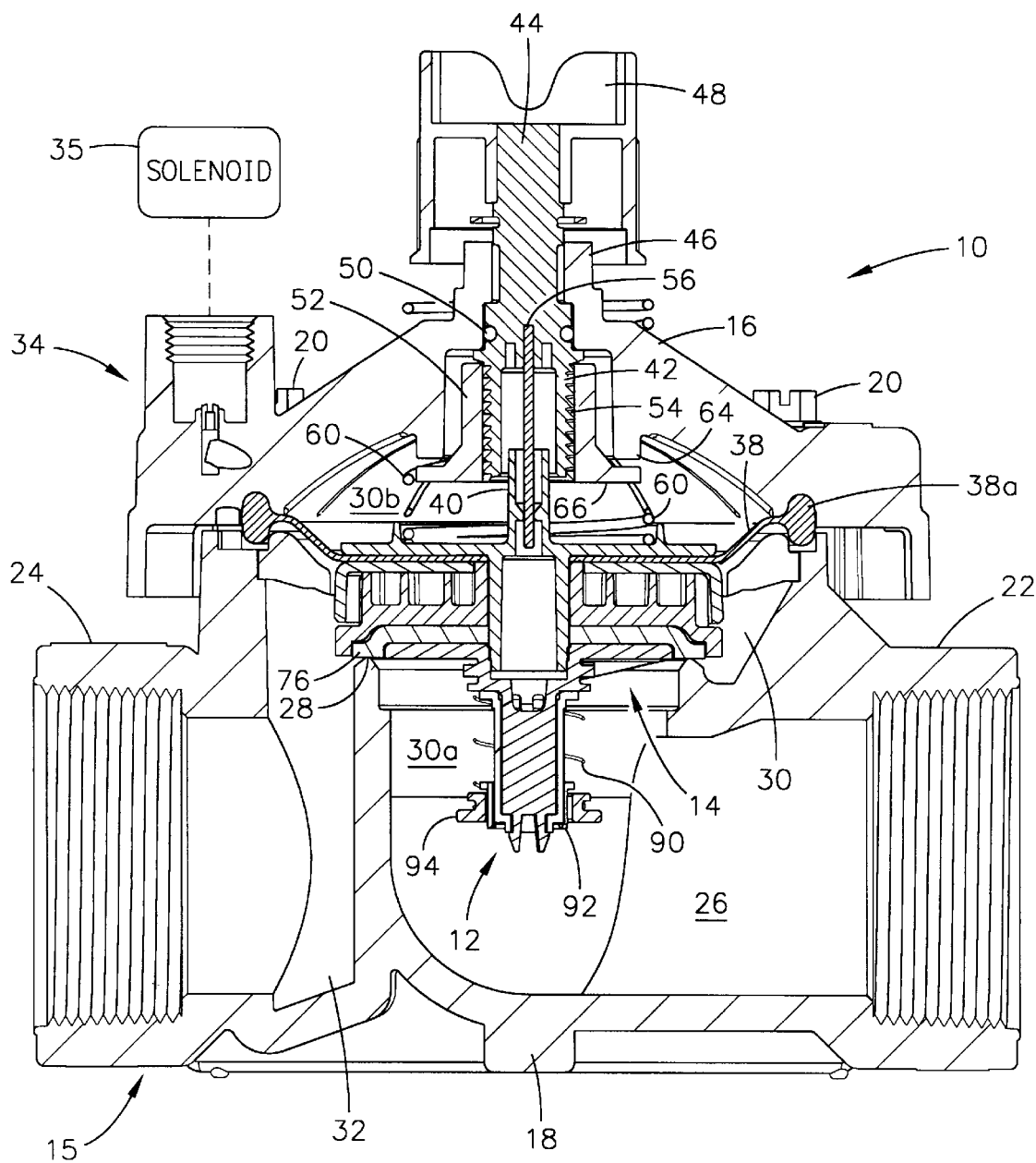
FIG. 1 is a vertical sectional view of a solenoid actuated diaphragm-type valve incorporating a filter screen and wiper element in accordance with a preferred embodiment of the present invention.

Referring to FIG. 1, a diaphragm-type valve 10 constructed in accordance with the present invention is illustrated in a vertical sectional view. Except for the addition of a built-in filter assembly 12, and a modified diaphragm assembly 14 designed to accommodate the filter assembly 12, the construction and operation of the valve 10 is similar to the diaphragm-type valve disclosed in co-pending U.S. patent application Ser. No. 09/054,151 filed Apr. 2, 1998 of Loren W. Scott entitled REMOVABLE CAPTIVE PLUNGER WITH CONTAMINATION PROTECTION. Said co-pending application of Loren W. Scott is assigned to Hunter Industries, Inc., the assignee of the present application. The entire disclosure of U.S. patent application Ser. No. 09/054,151 is specifically incorporated herein by reference.

The valve 10 (FIG. 1) is particularly suited for use in irrigation systems. Unless otherwise indicated, its parts are preferably made of injection molded plastic so that it is durable and inexpensive to manufacture and assemble. The valve 10 includes an outer valve clam shell housing 15 made of an upper dome-shaped cap section 16 and a lower base section 18. The sections 16 and 18 are removably held together with metal screws 20. The lower valve housing section 18 has a female threaded inlet port 22 for connection to threaded pipe or fitting (not illustrated) that is in turn connected to a pressurized source of irrigation water. The lower valve housing section 18 also has a female threaded outlet port 24 for connection to another threaded pipe or fitting (not illustrated) of a branch line that feeds one or more sprinklers. The inlet and outlet ports 22 and 24 are aligned with each other. The lower valve housing section 18 has a hollow inlet passage 26 that extends from the inlet port 20 and terminates at a primary circular valve seat 28. The valve seat 28 defines the lower part of a main hollow valve chamber 30 in which the diaphragm assembly 14 is mounted for vertical reciprocation.

The main valve chamber 30 (FIG. 1) communicates via a downstream hollow outlet passage 32 to the outlet port 24. The diaphragm assembly 14 engages and disengages the primary valve seat 28 to control the flow of water from the inlet passage 26 to the outlet passage 32. This is accomplished by moving the diaphragm assembly 14 up and down with a pilot valve 34 to open and close the valve 10. The pilot valve 34 is operated by a solenoid shown schematically as a box 35.

The diaphragm assembly 14 divides the main valve chamber 30 (FIG. 1) into a lower inlet chamber 30a and an upper pressure control chamber 30b. The diaphragm assembly 14 is illustrated in vertical section form in FIG. 3 and in exploded form in FIG. 4. In general, all of the components of the diaphragm assembly 14 hereafter described have a round cross-section which varies in radius moving up or down in FIGS. 3 and 4. The diaphragm assembly 14 includes a metering body 36 (FIG. 4) that overlies one side of a circular flexible membrane 38. The flexible membrane 38 is preferably made of an elastomeric material such as synthetic rubber. The outer annular periphery of the flexible membrane 38 has a bead 38a that is captured in conforming recesses molded in the upper and lower valve housing sections 16 and 18. The bead 38a is squeezed between the housing sections 16 and 18 when the screws 20 are tightened. This secures the diaphragm assembly 14 centrally in position inside the main valve chamber 30.

The metering body 36 (FIG. 4) includes an upper central cylindrical metering tube 40 that slides vertically within a cylindrical sleeve 42 (FIG. 1) formed on the lower end of a cylindrical shaft 44. The shaft 44 is rotatable inside a cylindrical bore formed by an upper cylindrical shoulder 46 located at the top of the dome-shaped cap section 16 of the valve housing 15. A knob 48 is securely attached to the upper end of the shaft 44. The knob 48 is manually rotatable to adjust the flow rate of the valve 10 as described hereafter.

An elastomeric O-ring 50 (FIG. 1) is seated in a groove formed in the outer wall of the shaft 44 and engages the facing surfaces of the cap section 16 to provide a water-tight seal. The outer surface of the sleeve 42 (FIG. 1) is threaded with male threads that engage complementary female threads on the inner surface of a cylindrical collar 52 to define a threaded joint 54.

A metering needle or rod 56 (FIG. 1) preferably made of metal has its upper end rigidly secured in the shaft 44. The rod 56 extends co-axially through the center of the cylindrical sleeve 42. The lower end of the metering rod 56 extends through a small venturi-shaped metering orifice 58 (FIG. 3) formed in the lower end of the metering tube 40.

A large coil spring 60 (FIG. 1) is compressed between the central horizontally extending disk portion 62 (FIGS. 3 and 4) of the metering body 36 and the underside of the dome-shaped cap section 16 of the valve housing 15. An annular shoulder 63 (FIG. 4) on the disk portion 62 retains the lower end of the coil spring 60. The upper end of the coil spring 60 surrounds a downwardly facing shoulder 64 formed on the underside of the cap section 16.

The knob 48 (FIG. 1) can be manually rotated to adjust the limit of vertical movement of the diaphragm assembly 14 which in turn determines the maximum flow rate of the valve 10 for a given water pressure. Rotation of the knob 48 also moves the metering rod 56 up and down through the metering orifice 58. Preferably there is only a relatively small clearance between the exterior surface of the metering rod 56 and the interior surface of the tube 40 that forms the metering orifice 58. This permits a minute flow of water from the lower inlet chamber 30a to the upper pressure control chamber 30b. The rod 56 is typically only withdrawn from the metering orifice 58 during disassembly of the valve 10.

It will be understood by those skilled in the art of diaphragm valve construction that dirt and other debris can clog the very small space between the metering rod 56 and the walls of the metering orifice 58. This will adversely affect the operation of the valve 10. Similarly, dirt and other debris can clog the small passages in the pilot valve 34 and/or impair the operation of the solenoid 35.

Manual rotation of the knob 48 also moves the collar 52 (FIG. 1) upward or downward. The flat underside 66 of the collar 52 can engage the upper side of the disk portion 62 (FIG. 4) of the metering body 36. The collar 52 (FIG. 1) thus provides a variable height stop that limits the vertical movement of the diaphragm assembly 14. As the pilot valve 34 allows water pressure to bleed off from the upper control chamber 30b, the diaphragm assembly 14 moves upwardly, compressing the coil spring 60. Water from the lower inlet chamber 30a can then flow directly from the inlet passage 26 into the outlet passage 32. The height of the collar 52, which is adjustable via the knob 48, determines the size of the gap between the valve seat 28 and the underside of the periphery of the diaphragm assembly 14. The size of this gap in turn determines the flow rate through the valve 10 for a given water pressure.

Figure 3:
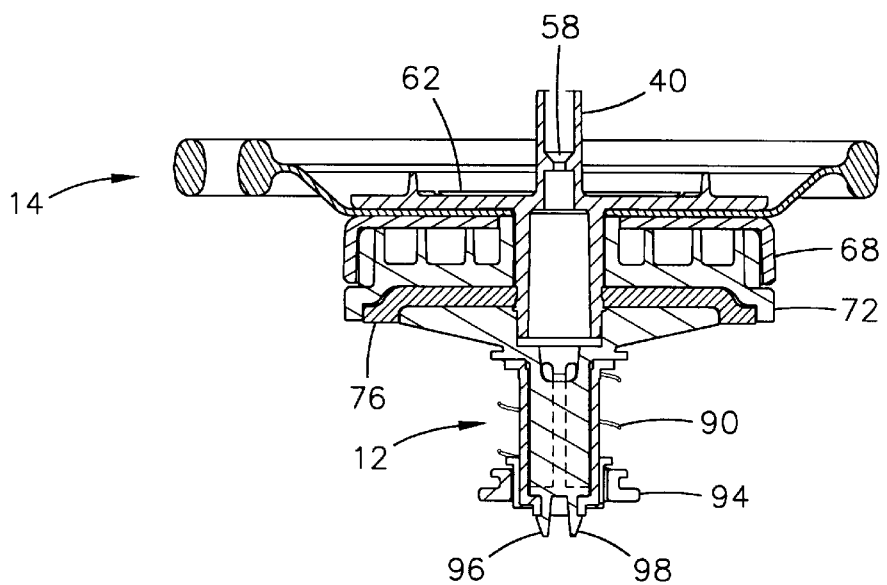
FIG. 3 is a vertical sectional view of the diaphragm assembly taken along line 3—3 of FIG. 2.
Figure 4:
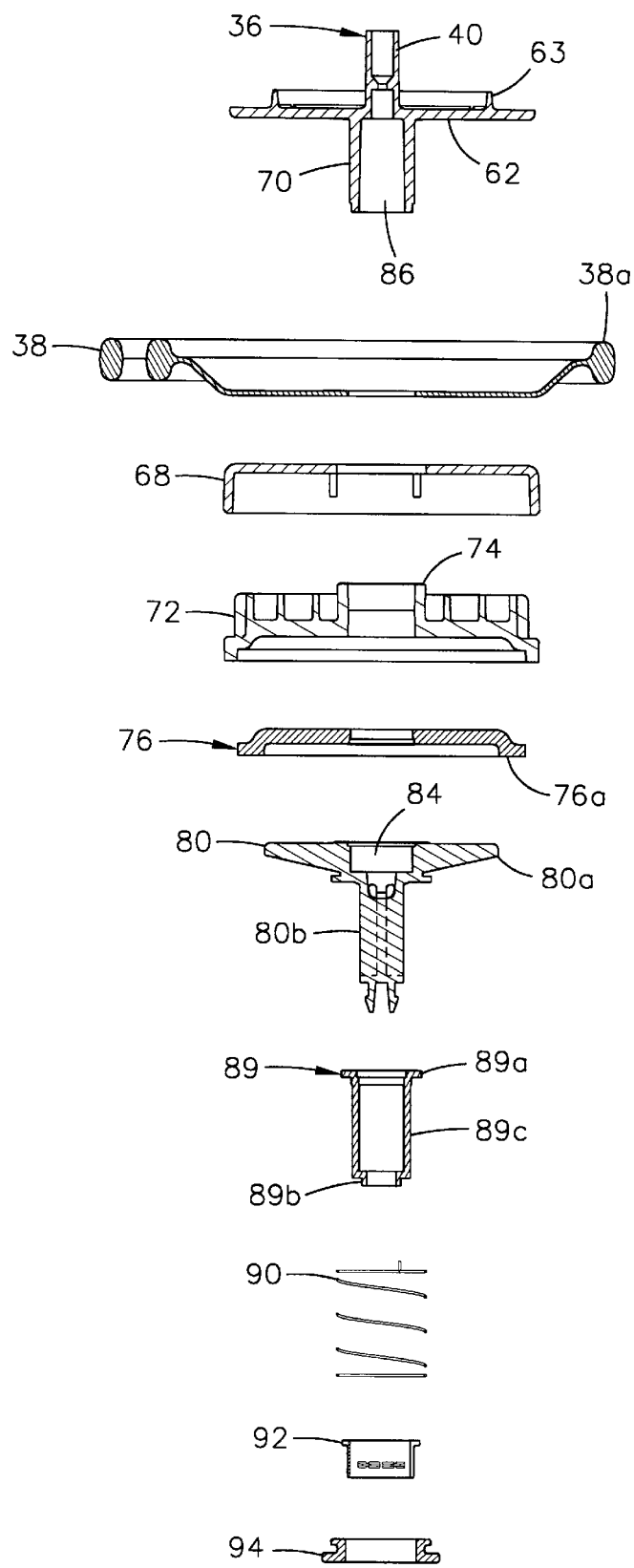
FIG. 4 is a further reduced exploded vertical sectional view of the diaphragm assembly of FIGS. 2 and 3.

Referring to FIG. 4, a shallow cylindrical seal support 68 on the underside of the metering body 36 surrounds a lower cylindrical post 70 of the metering body 36. A cylindrical seal support 72 has an upstanding cylindrical socket 74 that engages the lower end of the post 70. A disk-shaped elastomeric seal 76 overlaps the underside of the seal support 72. The outer periphery or lip 76a (FIG. 3) of the seal 76 engages and disengages the primary circular valve seat 28 (FIG. 1) to open and close the valve 10.

The remaining parts of the diaphragm assembly 14 illustrated in the lower third of FIG. 4 form the filter assembly 12. These parts include a central support member 80 having a frusto-conical base 80a and a downwardly extending mandrel 80b. As best seen in FIGS. 9 and 13 the mandrel 80b has an X-shaped cross section consisting of two planar members 81 that intersect at a right angle. Four metering passages 82 (FIGS. 9 and 11) extend through the mandrel 80b. The metering passages 82 are formed at the intersection of the planar members 81 and the base 80a. The metering passages 82 communicate with a stepped cylindrical chamber 84 (FIG. 11) formed in the center of the frusto-conical base 80a. As best seen in FIG. 4, the chamber 84 communicates through holes in the center of the seal 76, seal support 72, support cover 68 and membrane 38 to the hollow interior 86 of the post 70. The hollow interior 86 of the post 70 communicates with the metering orifice 58. The foregoing arrangement permits water to flow slowly through the center of the diaphragm assembly 14 to pressurize the pressure control chamber 30b.

Referring still to FIG. 4, the filter assembly 12 further includes a generally cylindrical filter screen 88. The filter screen 88 is preferably made of woven stainless steel mesh or screen material of suitable porosity. The filter screen 88 fits within a surrounding filter screen support frame 89. The filter screen support frame 89 comprises upper and lower rings 89a and 89b connected by two parallel spaced apart vertical guide rails 89c. The upper and lower ends of the filter screen 88 are snugly engaged by the rings 89a and 89b. The filter screen 88 fits between the guide rails 89c. Thus most of the filter screen 88 is exposed to the inlet chamber 30a.

The filter screen assembly comprising the screen 88 and support frame 89 fits over the mandrel 80b (FIG. 4). A coil spring 90 surrounds the filter screen assembly. A split cylindrical wiper element 92 (FIG. 5) surrounds the filter screen 88 for sliding up and down around the same during opening and closing of the valve 10 as hereafter described in detail.

A ring-shaped wiper element carrier 94 (FIG. 7) surrounds and holds the wiper element 92. As illustrated in FIG. 3, the coil spring 90 is compressed between the underside of the frusto-conical base 80a of the central support member 80 and the wiper element carrier 94. Two resilient diametrically spaced hook-shaped fingers 96 and 98 (FIGS. 9 and 12) are formed on the lower end of the mandrel 80b. The fingers 96 and 98 are squeezed together to allow the assembled filter screen 88 and filter screen support frame 89 to be slid over the mandrel 80b, after which they expand apart over the lower ring 89b (FIG. 4) of the support frame 89. A disk-shaped planar element 100 (FIG. 9) formed at the lower end of the mandrel 80b seals the lower ring 89b to ensure that any water that enters the metering passages 82 to pass through the diaphragm assembly 14 must first pass through the filter screen 88.

Figure 5:
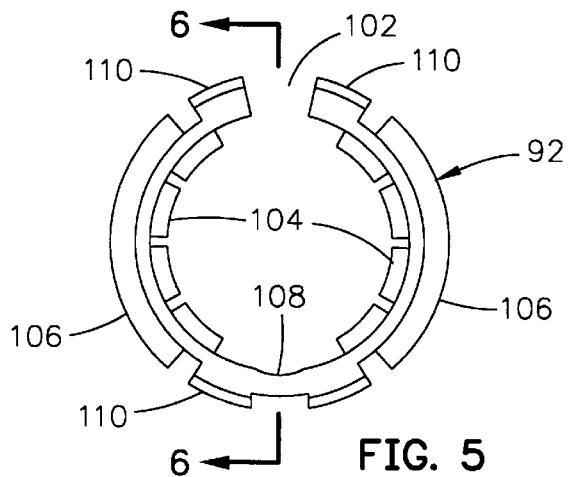
FIG. 5 is an enlarged plan view of the wiper element of the diaphragm assembly of FIG. 3.
Figure 6:
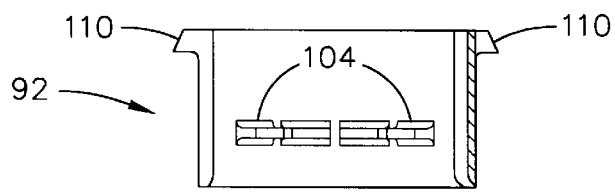
FIG. 6 is a vertical sectional view of the wiper element taken along line 6—6 of FIG. 5.

FIGS. 5 and 6 illustrate details of the wiper element 92. It has a cylindrical configuration with a split 102 to allow the same to be compressed and inserted inside of the wiper element carrier 94. The wiper element 92 has eight discrete radially inwardly extending scrubber elements 104. The innermost edges of the scrubber elements 104 engage the stainless steel filter screen 88 to scrub off mineral deposits and algae as the wiper element 92 slides up and down around the filter screen 88. The wiper element 92 also has two diametrically spaced outwardly extending flanges 106 formed on its upper end that overlap the upper side of the wiper element carrier 94 to help hold the wiper element 92 and wiper element carrier 94 together as further explained hereafter. An inwardly facing groove 108 is formed in the wiper element 92 that receives one of the guide rails 89c of the filter screen support frame 89. The other guide rail 89c slides in the split 102. Four flanges 110 are formed on the lower end of the wiper element 92. The flanges 110 oppose the two flanges 106 formed on the upper end of the wiper element 92. The flanges 110 overlap the lower side of the wiper element carrier 94 so that together the flanges 106 and 110 hold the wiper element 92 and wiper element carrier 94 together.

Figure 7:
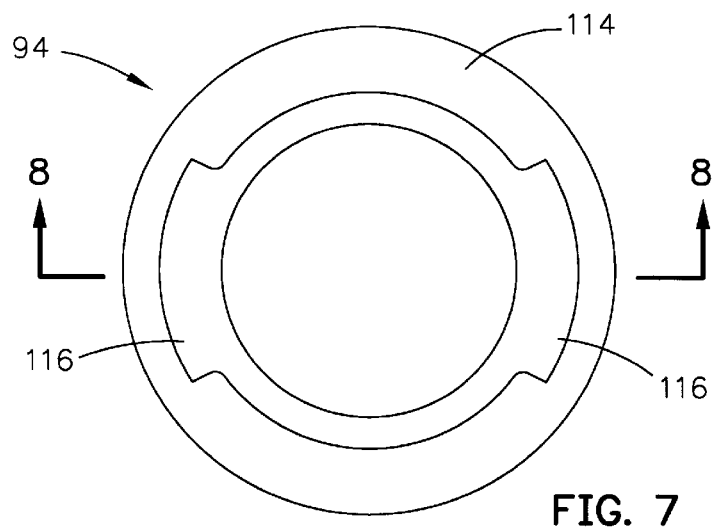
FIG. 7 is an enlarged plan view of the wiper element carrier of the diaphragm assembly of FIG. 3.
Figure 8:
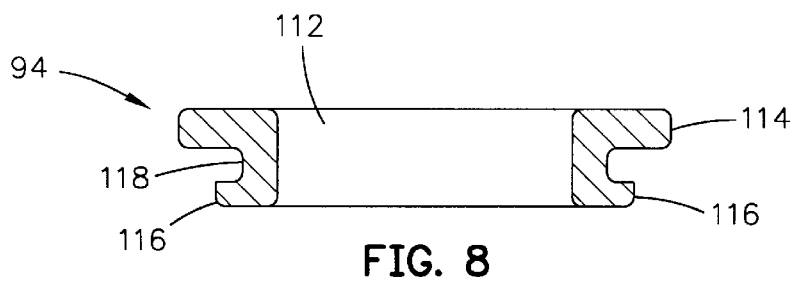
FIG. 8 is a vertical sectional view of the wiper element carrier taken along line 8—8 of FIG. 7.

FIGS. 7 and 8 illustrate details of the wiper element carrier 94. It comprises a cylindrical central body 112 with a larger circular flange 114 that extends radially outwardly from its lower end. A pair of diametrically spaced flanges 116 extend radially outwardly from the upper end of the body 112. The flanges 114 and 116 define a groove 118 between the same which receives the final lower turn of the coil spring 90.

The coil spring 90 is configured so that when the carrier 94 is in its lowermost position illustrated in FIG. 3, the spring 90 is substantially relaxed. When the valve 10 is opened, the spring 90 is substantially compressed or collapsed. When the valve 10 is closed, the spring 90 serves to retain the carrier 94 on the lowermost end of the filter assembly 12. The inner edges of the scrubber elements 104 ride up against the slightly enlarged portion of the filter screen 88 that covers the lower ring 89b of the filter screen support frame 89. This also prevents the wiper element 92 from riding off the end of the filter screen 88.

The pressure control chamber 30b is located above the diaphragm valve assembly 14. As illustrated in FIG. 1, the valve is in its OFF configuration, since the seal 76 is in contact with the primary valve seat 28. The area above the diaphragm assembly 14, which is affected by the pressure in the pressure control chamber 30b, is greater than the area below the diaphragm assembly 14, which is affected by the pressure in the lower inlet chamber 30a. Pressurized water from the inlet 26 flows slowly through the diaphragm assembly 14 to the upper control chamber 30b to force the diaphragm assembly 14 downwardly. The coil spring 60 also puts a downward bias force on the diaphragm assembly 14. As a consequence, there is a combined downward force on the diaphragm assembly 14 which presses the seal 76 against the valve seat 28. The valve 10 is then in its closed or OFF configuration and no water can flow directly from the inlet passage 26 to the outlet passage 32.

Pressurized water can be vented from upper pressure control chamber 30b via the pilot valve 34 as is well known in the art. The pilot valve 34 is opened and closed by the solenoid 35 to allow water from a pilot valve passage (not illustrated) to enter the outlet passage 32. This relieving of pressure enables pressurized water in the lower inlet chamber 30a to force the diaphragm assembly 14 upwardly, lifting the seal 76 from the primary valve seat 28. This opens the valve 10 to its ON configuration, allowing water to flow directly between the inlet passage 26 and the outlet passage 32.

Figure 2:
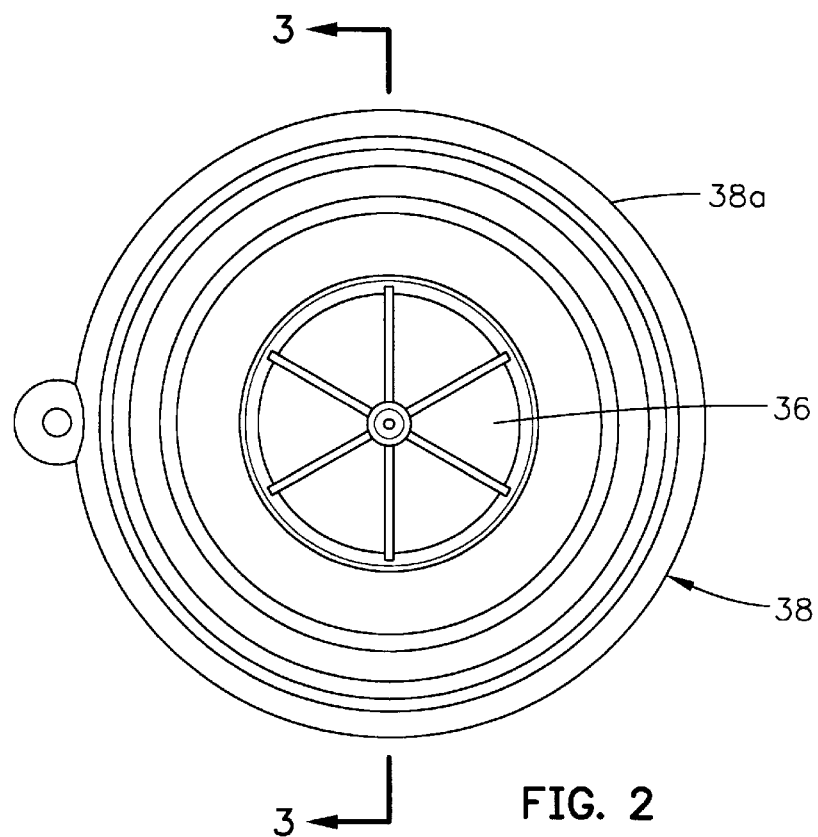
FIG. 2 is a slightly reduced top plan view of the diaphragm assembly of the valve of FIG. 1.

The flexible membrane 38 (FIGS. 2 and 3) of the diaphragm assembly 14 operates as a sort of circular hinge that allows the central portion of the diaphragm assembly 14 to reciprocate up and down. The membrane 38 also operates as a seal in that it prevents water from entering the upper pressure control chamber 30b except through the center of the diaphragm assembly. The membrane 38 also prevents water from leaving the upper pressure control chamber 30b except through a passage (not illustrated) connecting the upper pressure control chamber 30b to the pilot valve 34.

Closing of the pilot valve 34 enables build up of pressure in upper pressure control chamber 30b and downward motion of the diaphragm assembly 14 until the seal 76 re-engages the primary valve seat 28. This prevents water from flowing directly between the inlet and outlet passages 26 and 32, resulting in the closing of the valve 10. As already explained, the knob 48 can be rotated to set the upper limit of movement of the diaphragm assembly 14 and set the maximum flow rate through the valve 10 for a given water pressure.

When the solenoid 35 is energized by an electrical signal from an irrigation controller (not shown) carried on a wire (not shown), water is vented from the upper pressure control chamber 30b. This permits water to flow out of the pressure control chamber 30b and then to the outlet passage 32. As a result, pressure in the chamber 30b will decrease enough so that the pressure inside the lower inlet chamber 30a is higher by an amount sufficient to raise the seal 76 off the valve seat 28. This allows water to flow from the inlet passage 26 past valve seat 28 and directly into the outlet passage 32. When the solenoid 35 is de-energized, the force of the spring 60 and the build-up of water pressure inside the pressure control chamber 30b push the diaphragm assembly 14 downwardly, pushing the seal 76 into engagement with the valve seat 28 to close the valve 10.

When the diaphragm assembly 14 is moving upwardly to open the valve 10, the water that flows from the inlet passage 26 to the outlet passage 32 acts against the wiper element carrier 94, causing it to gradually rise upwardly relative to the filter screen 88. The force of the water is sufficient to overcome the force of the lightweight coil spring 90 which is then gradually compressed. During the movement of the wiper element carrier 94, the scrubber elements 104 of the wiper element 92 engage and slide along the surface of the stainless steel filter screen 88. The wiper element 92 scours the surface of the filter screen 88 to remove microscopic mineral particles and algae that would otherwise build up on the filter screen 88. Over time this build-up can cause premature failure of the valve 10. The turbulence of the water flowing past the wiper element carrier 94 causes it to rattle or oscillate back and forth as it moves up the filter screen 88. This causes the scrubber elements 104 to vibrate against the filter screen 88, thus improving the scouring action. The gaps between the scrubber elements 104 also permit debris to flow away, through the outlet passage 32.

When the valve 10 is closed, the diaphragm assembly 14 descends to its lowermost position, shutting off the flow of water between the inlet and outlet passages 26 and 32. The absence of the force of flowing water against the wiper element carrier 94 causes the coil spring 90 to push the wiper element carrier 94 back to its lowermost position. Thus scouring action of the self-cleaning filter assembly 78 also occurs during the downward travel of the wiper element 92 past the outer surface of the filter screen 88. Preferably the wiper element 92 is dimensioned so that the inner edges of the scrubber elements 104 firmly engage the filter screen 88 without undue deformation of the same. This will ensure efficient removal of deposited solids such as minerals and algae, as well as the dislodging of any dirt particles adhered to the surface of the filter screen 88. The filter screen 88 also prevents particles of dirt and debris from clogging the small space between the metering rod 56 and the walls of the metering orifice 58 and the small passages in the pilot valve 34. The filter screen 88 also prevents this debris from fouling the operation of the solenoid 35.

Thus our invention provides a self-contained filter cleaning device for use in a solenoid actuated hydraulic diaphragm valve. The substantially free-floating wiper element 92 slides along the exterior surface of the filter screen 88 to remove debris as it rubs along the filter screen surface. The configuration of our filter assembly with its moveable cleaning element is readily adaptable to existing diaphragm valve configurations. As the diaphragm assembly 14 lifts upon opening of the valve 10, the wiper carrier 94 is driven by the flow of water along substantially the entire length of the filter screen 88. The wiper element carrier 94 in turn moves the wiper element 92 upwards along substantially the entire longitudinal dimension of the filter screen 88, removing debris therefrom as it travels. Upon closing of the valve 10, the wiper element 92 and wiper carrier 94 are driven downwardly back to their original position by the self-contained and captive coil spring 90. This action also removes debris, resulting in a double wiping or scouring of the filter screen 88 for each open and closing cycle of the valve 10.

Our design ensures full wiping of the filter screen 88 because the movement of the wiper 92 is not dependent upon the distance the diaphragm assembly 14 moves, as is the case in prior art designs such as U.S. Pat. Nos. 4,081,171 and 4,360,037. In such designs, the filter is attached to the underside of the diaphragm assembly and brushes or scraper blades are attached to the bottom shell of the outer valve housing. If the valve has been adjusted for minimal flow when open, hardly any relative movement between the filter screen and the brushes or scraper blades occurs. Therefore, under low flow rate conditions only a very small portion of the vertical length of the filter screen gets scraped in these prior art designs. Regardless of the flow rate adjusted in our valve via knob 48, the wiper element 92 still travels substantially the entire length of the filter screen 88.

FIG. 14 illustrates a modified wiper element carrier 120 that may be used in an alternate embodiment of the present invention. The carrier 120 has a ring-shaped central body 121. A plurality of appropriately shaped and angled impeller blades 122 extend outwardly from the carrier body 121. The carrier 120 may be used with a modified wiper element (not illustrated) shaped to spin freely around the filter screen 88. Preferably the filter screen support frame 89 is located entirely within the cylindrical filter screen 88 to facilitate such spinning. In this modification of the filter assembly 12 the coil spring 90 is eliminated. During the opening of a diaphragm valve having a filter assembly equipped with the modified wiper element carrier 120, the incoming water spins the carrier 120 and the wiper element 92 about their central vertical axes. This increases the scouring action of the scrubber elements 104. The configuration of the scrubber elements 104 can be modified to take advantage of this circular action, such as by inclining the same or twisting them ninety degrees from the orientation depicted in FIG. 5.

Our invention may also be used with other forms of valves used in the irrigation industry, such as a piston-type valve. This valve is similar to a diaphragm-type valve except that a piston with a metering orifice is used instead of a diaphragm assembly with a flexible outer membrane that is anchored between the two halves of the valve housing. The piston reciprocates up and down inside a cylindrical valve housing as water is bleed off, or fills up, the upper pressure control chamber through a solenoid controlled pilot valve. Thus all that is necessary for our invention to be utilized is that there be a valve member, such as a diaphragm assembly or a piston, with a metering orifice through the valve member and a filter screen positioned for cleansing debris from the water before it passes through the metering orifice.

While we have illustrated and described our diaphragm valve with a self-cleaning filter assembly by means of specific embodiments, it should be understood that numerous changes and modifications may be made therein without departing from the spirit and scope of the invention as defined in the appended claims.

We claim:

1. A diaphragm valve, comprising:
   a valve housing having an inlet passage, an outlet passage, a primary valve seat between the inlet passage and the outlet passage, a lower inlet chamber below the primary valve seat, and an upper pressure control chamber above the primary valve seat;
   a pilot valve operatively associated with the upper pressure control chamber for selectively venting pressurized water therefrom;
   a diaphragm assembly mounted inside the valve housing and having a seal normally engaged with the primary valve seat to seal the inlet passage from the outlet passage, the diaphragm assembly being moveable in a first direction to disengage the seal from the primary valve seat upon release of a sufficient amount of pressurized water from the upper pressure control chamber, the diaphragm assembly including means for metering water from the lower inlet chamber through the diaphragm assembly into the upper pressure control chamber; and
   a longitudinally extending filter assembly located inside the lower inlet chamber and coupled to the water metering means for removing debris from pressurized water before it passes from the inlet passage into the upper pressure control chamber through the water metering means, including a filter screen and a wiper element surrounding the filter screen and mounted for longitudinal reciprocation over an exterior surface of the filter screen to remove debris, the wiper element being floating and moved in the first direction by water flowing from the inlet passage to the outlet passage.

2. A diaphragm valve according to claim 1 wherein the filter assembly further includes spring means for moving the wiper element in a second direction opposite the first direction when water ceases flowing from the inlet passage to the outlet passage.

3. A diaphragm valve according to claim 1 wherein the filter assembly further includes a carrier surrounding the wiper element.

4. A diaphragm valve according to claim 1 wherein the filter screen is cylindrical.

5. A diaphragm valve according to claim 3 wherein the wiper element and carrier are both cylindrical.

6. A diaphragm valve according to claim 3 wherein the filter assembly further includes a spring surrounding the filter screen and positioned for compression between the carrier and the diaphragm assembly.

7. A diaphragm valve according to claim 1 wherein the wiper element is configured to have a rotational movement imparted to the same by the force of water flowing from the inlet passage to the outlet passage, the rotational movement of the wiper element being around a longitudinal axis of the filter screen.

8. A diaphragm valve according to claim 1 wherein the filter assembly further includes a support frame for holding the filter screen.

9. A diaphragm valve according to claim 8 wherein the support frame has at least one longitudinally extending guide rail and the wiper element has a corresponding longitudinally extending groove for receiving the guide rail to guide the wiper element through its longitudinal motion.

10. A diaphragm valve according to claim 1 wherein the wiper element has a plurality of scrubber elements each having a inner edge that engages the exterior surface of the filter screen.

11. A self-cleaning filter assembly for a valve having a vertically reciprocal diaphragm assembly that separates a lower inlet chamber from an upper pressure control chamber vented by a pilot valve, the diaphragm assembly including a metering orifice, the filter assembly comprising:
    a filter screen connected to the diaphragm assembly and located in the inlet chamber for preventing debris from entering the metering orifice; and
    a free floating wiper element moveable in an upward direction along an exterior surface of the filter screen by the flow of water through the valve when the valve is open for scouring debris from the exterior surface.

12. A filter assembly according to claim 11 and further comprising spring means for moving the wiper element in a downward direction when the valve is closed and water ceases flowing therethrough.

13. A filter assembly according to claim 11 and further comprising a carrier surrounding the wiper element.

14. A filter assembly according to claim 11 wherein the filter screen is cylindrical.

15. A filter assembly according to claim 13 wherein the wiper element and carrier are both cylindrical.

16. A filter assembly according to claim 13 and further comprising a spring surrounding the filter screen and positioned for compression between the carrier and the diaphragm assembly.

17. A filter assembly according to claim 11 wherein the wiper element is configured to have a rotational movement imparted to the same by the force of water flowing through the valve, the rotational movement of the wiper element being around a longitudinal axis of the filter screen.

18. A filter assembly according to claim 11 and further comprising a support frame for holding the filter screen, the support frame having at least one longitudinally extending guide rail and the wiper element having a corresponding longitudinally extending groove for receiving the guide rail to guide the wiper element through its longitudinal motion.

19. A filter assembly according to claim 11 wherein the wiper element has a plurality of radially inwardly directed scrubber elements each having a inner edge that engages the exterior surface of the filter screen.

20. A diaphragm valve, comprising:

a valve housing having an inlet passage, an outlet passage, a primary valve seat between the inlet passage and the outlet passage, a lower inlet chamber below the primary valve seat, and an upper pressure control chamber above the primary valve seat;

a pilot valve coupled to the upper pressure control chamber for selectively venting pressurized water therefrom;

a diaphragm assembly mounted inside the valve housing and having an outer seal normally engaged with the primary valve seat to seal the inlet passage from the outlet passage, the diaphragm assembly being moveable in a first direction to disengage the seal from the primary valve seat and open the valve upon release of a sufficient amount of pressurized water from the upper pressure control chamber through actuation of the pilot valve, the diaphragm assembly being moveable in a second direction opposite the first direction to close the valve upon further actuation of the pilot valve to cause the build-up of sufficient pressure inside the upper pressure control chamber, the diaphragm assembly including means for metering water from the lower inlet chamber through the diaphragm assembly into the upper pressure control chamber; and a longitudinally extending filter assembly located inside the lower inlet chamber and coupled to the water metering means for removing debris from pressurized water before it passes from the lower inlet chamber into the upper pressure control chamber through the water metering means, including a filter screen, a wiper element surrounding the filter screen and mounted for longitudinal reciprocation over an exterior surface of the filter screen to remove debris, a carrier surrounding and supporting the wiper element, and a spring compressed between the carrier element and the diaphragm assembly, the carrier and wiper element being free floating and moved in the first direction by water flowing from the inlet passage to the outlet passage when the valve is open, and the wiper element and carrier being moved in the second direction when the valve closes.

21. A valve, comprising:

a valve member;

a valve housing having an inlet passage and an outlet passage, the valve member being reciprocable back and forth within the valve housing to thereby connect and disconnect the inlet passage and the outlet passage, the valve housing having a lower inlet chamber below the valve member, and an upper pressure control chamber above the valve member;

a pilot valve operatively associated with the upper pressure control chamber for selectively venting pressurized water therefrom:

the valve member normally sealing the inlet passage from the outlet passage and being moveable in a first direction to connect the inlet passage with the outlet passage upon release of a sufficient amount of pressurized water from the upper pressure control chamber;

the valve member including means for metering water from the lower inlet chamber through the valve member into the upper pressure control chamber; and a longitudinally extending filter assembly located inside the lower inlet chamber and coupled to the water metering means for removing debris from pressurized water before it passes from the inlet passage into the upper pressure control chamber through the water metering means, including a filter screen and a wiper element surrounding the filter screen and mounted for longitudinal reciprocation over an exterior surface of the filter screen to remove debris, the wiper element being free floating and moved in the first direction by water flowing from the inlet passage to the outlet passage.

22. A valve according to claim 21 wherein the filter assembly further includes spring means for moving the wiper element in a second direction opposite the first direction when water ceases flowing from the inlet passage to the outlet passage.

23. A valve according to claim 21 wherein the filter assembly further includes a carrier surrounding the wiper element.

24. A valve according to claim 21 wherein the filter screen is cylindrical.

25. A valve according to claim 23 wherein the wiper element and carrier are both cylindrical.

26. A valve according to claim 23 wherein the filter assembly further includes a spring surrounding the filter screen and positioned for compression between the carrier and the valve member.

27. A valve according to claim 21 wherein the wiper element is configured to have a rotational movement imparted to the same by the force of water flowing from the inlet passage to the outlet passage, the rotational movement of the wiper element being around a longitudinal axis of the filter screen.

28. A valve according to claim 21 wherein the filter assembly further includes a support frame for holding the filter screen.

29. A valve according to claim 28 wherein the valve member is a diaphragm assembly.

30. A diaphragm valve according to claim 21 wherein the valve member is a piston.

\* \* \* \* \*